United States Patent [19]
Klee et al.

[11] Patent Number: 5,304,019
[45] Date of Patent: Apr. 19, 1994

[54] ROTATING DRILL HEAD WITH A BORING BAR WHICH IS PIVOTABLE BY A SLIGHT DISTANCE TRANSVERSELY TO THE AXIS OF ROTATION BY FLUIDIC MEANS

[75] Inventors: Gerhard Klee, Frankfurt; Wilfried Gerk, Roedermark, both of Fed. Rep. of Germany

[73] Assignee: Samson AG, Frankfurt, Fed. Rep. of Germany

[21] Appl. No.: 61,862

[22] Filed: May 14, 1993

[30] Foreign Application Priority Data

Jun. 4, 1992 [DE] Fed. Rep. of Germany ....... 4218492

[51] Int. Cl.⁵ .............................................. B23B 51/00
[52] U.S. Cl. .................................... 408/156; 408/159; 408/180
[58] Field of Search ............... 408/147, 153, 156, 154, 408/159, 180; 82/1.5; 407/8, 9

[56] References Cited

U.S. PATENT DOCUMENTS

| | | | |
|---|---|---|---|
| 3,007,356 | 11/1961 | Jones | 408/147 |
| 3,422,705 | 1/1969 | Nahodil et al. | 408/147 |
| 3,749,508 | 7/1973 | Schukrafft | 408/156 |

*Primary Examiner*—Daniel W. Howell
*Attorney, Agent, or Firm*—McAulay Fisher Nissen Goldberg & Kiel

[57] ABSTRACT

Rotating drill head with a boring bar which is swivel able by small amounts transversely to the rotational axis by fluidic means, with a base, a driven member located opposite the base, a pressure chamber arranged between the base and driven member and having a fluid inlet, and with an expanding lever gearing in a working connection with the driven member and serving for the synchronous and oppositely directed swiveling of a tool carrier and a compensating member which are constructed so as to be geometrically similar and constitute the boring bar.

9 Claims, 1 Drawing Sheet

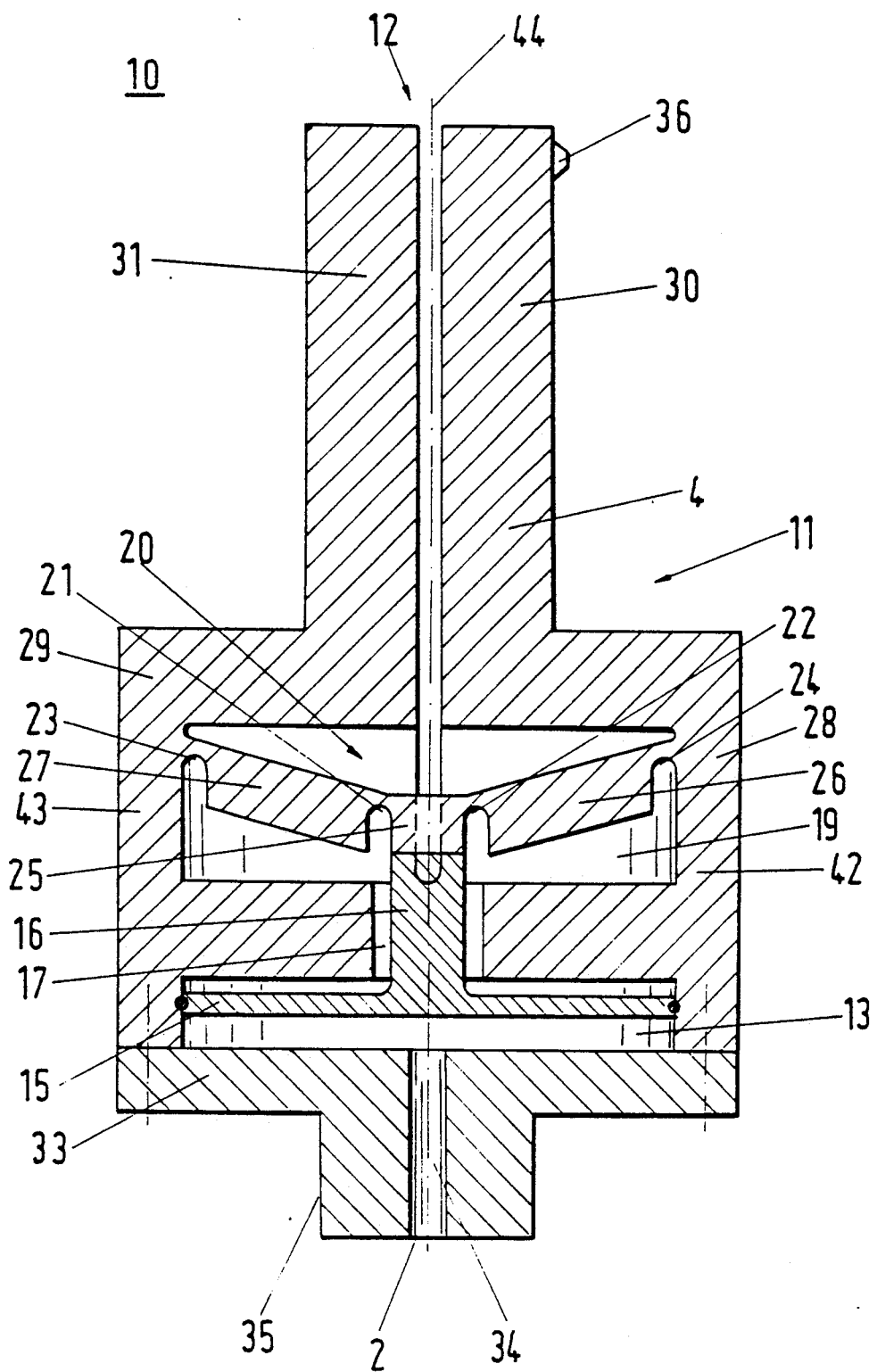

ROTATING DRILL HEAD WITH A BORING BAR WHICH IS PIVOTABLE BY A SLIGHT DISTANCE TRANSVERSELY TO THE AXIS OF ROTATION BY FLUIDIC MEANS

BACKGROUND OF THE INVENTION a) Field of the Invention

The invention is directed to a cutting chisel holder with a cutting chisel which can be clamped in, particularly a rotating drill head which is adjustable in a fluidic manner.

b) Background Art

DE 34 33 793 Al (FIG. 3) discloses a rotating drill head with a tool carrier which is precisely adjustable transversely to the axis of rotation and has a wedge or key carrier which displaces the tool carrier transversely relative to the axis of rotation. The tool carrier, which forms a displacing part, is associated with an additional displacing part. The tool carrier and displacing part have sloping surfaces which face one another and are pressed outward by the key carrier. The tool carrier and displacing part are accordingly moved outward symmetrically in opposite directions in order to counterbalance occurring centrifugal forces with respect to the axis of rotation.

However, due to the multitude of parts sliding against one another, the mechanical operating means is subject to high friction so that it is not possible for such drill heads to meet the demand for a quick adjustment of the cutting chisel to produce inner cylindrical surface areas with accurate dimensions and minimum deviation (roughly 500μ to 1,000μ) from an exactly cylindrical surface area.

Further, a precisely adjustable drill head is known in which the driven member is a plate having projections and resting thereon. A tappet situated in an eccentric bore hole of the boring bar rests on the side of the plate which faces away. When acted upon in the axial direction, this tappet causes the boring bar, which has a thin and a thick wall due to the eccentric bore hole, to be stretched along its thinner wall so that the boring bar swivels toward the thicker wall and, in doing so, impresses upon the cutting chisel a virtually axially vertical advancing motion in the μ range transverse to the axis of rotation (see U.S. Pat. No. 3,007,356, FIG. 2).

Since the tappet contacts the plate eccentrically, the plate and tappet form a lever gearing which is unbalanced when deflected and is likewise subject to repetitive friction. Further, the tappet is acted upon obliquely as a result of this construction and accordingly experiences lateral deflections which lead to jamming of the tappet in the bore hole. Frictional and clamping forces prevent such a drill head from following slight changes in pressure whose effect does not exceed the frictional forces, and when larger forces occur the cutting chisel position cannot be associated with the control pressure in a reproducible manner, so that different cutting chisel positions result under the same control pressure, depending on whether it is falling or rising.

To prevent troublesome frictional forces and maintain the desired stiffness of the mechanical operating means, it is known to construct the drive member and boring bar in one piece (see DE 39 29 472-Al, FIG. 1).

To this end, the drill head includes a flat rotating part having a circular cross section and divided into two portions by an eccentric recess or groove, namely into a portion forming a thin plate and a portion forming a thick plate, which portions are connected with one another by the round, off-center portion formed by the groove. The relatively thin plate resulting from the groove is springing or resilient relative to the comparatively thick plate and simultaneously forms part of the compression motor, whose rigid base forms the thick plate or disk. In addition, the thin plate has a continuation which faces away and has a cylindrical outer surface area in which a piston shaped continuation engages, the latter being constructed in one piece with the boring bar. This piston-shaped continuation forms the driven member and is securely connected with the thin plate by screws. Due to the eccentricity of the remaining portion between the thick and thin plates, a change in pressure of the pressure medium supplied to the compression motor results in a driven path in the μ range determined by the path of the driven center of gravity of the thin plate relative to the thick plate.

With the exception of the construction according to DE 34 33 793 Al, FIG. 3, these constructions of drill heads have the disadvantage that the boring bar forming part of the drill head is out of balance when deflected. At very high speeds of the drill head, which can reach 8,000 r.p.m. and more, this unbalance can generate forces high enough to overload the bearings of the drill machine to which these forces are transmitted. Apart from this, such unbalance works against the reproducible adjustment of the boring bar.

OBJECT AND SUMMARY OF THE INVENTION

A primary object of the present invention is to provide a novel cutting chisel holder of the type in question which satisfies practical requirements better than was formerly possible and whose mechanical parts effecting the operating or adjusting movements of the cutting chisel are constructed and arranged in such a way that they work without friction and are capable of deflecting the tool carrier without unbalance, which particularly affects the adjustment of the cutting chisel.

This object is met, according to the invention, by a cutting chisel holder with a cutting chisel which can be clamped in, particularly a rotating drill head which can be precisely adjusted by hydraulic means, with a base, a driven member which is movable relative to the base, a fluid pressure-medium chamber having a fluid inlet and arranged between the base and driven member, and with gearing members which are associated with the driven member and can be moved by the driven member in such a way that the cutting chisel is moved by small amounts around a curved path extending transversely to the rotational axis, and with a compensating mass which compensates for the unbalance occurring during the deflection of the tool carrier by means of symmetrical, but oppositely directed, movement. The improvement comprises that the tool carrier and the compensating mass (compensating member) are connected via a spring-jointed expanding lever gearing whose central member connecting the leg members is acted upon by the driven member.

As a result of the inventive construction of the functional area of the drill head as an integral bend articulation in the form of an expanding lever gearing and due to the symmetrical arrangement of the tool carrier and compensating member in the configuration of a boring bar which is symmetrical with respect to rotation, not only is the tool carrier displaced by small amounts transversely to the axis of rotation of the drill head as the pressure medium takes effect in the pressure chamber, but the compensating member is also displaced transversely to the axis of rotation by the same amount, but in the opposite direction. Consequently, as a result of the movements of the tool and compensating member which are effected symmetrically relative to the axis of rotation, troublesome unbalance with reference to the axis of rotation is compensated for.

Another advantage consists in that the angle of swivel of the tool carrier relative to the compensating member can be changed in a simple manner by means of the thickness of the bending zones. For example, if the bending zone of the compensating member is thicker than that of the tool carrier, the portion of the boring bar associated with the compensating member bends by a smaller angle than the tool carrier when deflected. In this way, the deflection of the boring bar can be increased corresponding to the prevailing conditions, although a certain unbalance must be taken into account. Also, one bend articulation can be made so stiff that the deflection of the compensating member relative to the deflection of the tool carrier is negligible. Thus, the path of the tool carrier is approximately doubled, although the compensating of unbalance according to the invention is forfeited in so doing. Thus, as a result of the inventive construction of the functional areas of the drill head, drill heads with and without compensation of unbalance can be identically constructed.

The invention is described in the following with reference to an embodiment example of a cutting chisel holder with a cutting chisel, which can be clamped in, in the form of a rotating drill head as depicted in the drawing. The scope of the invention will be pointed out in the appended claims.

BRIEF DESCRIPTION OF THE DRAWING

The drawing illustrates, in cross section, a rotating drill head in accordance with the invention in schematic representation.

DESCRIPTION OF THE PREFERRED EMBODIMENTS

The drill head, designated in its entirety by 10, substantially includes a main part 11 which is constructed symmetrically with respect to rotation. At one end, the main part 11 passes into a boring bar 12 which is symmetrical with respect to rotation, its other end having a pressure chamber 13 formed by turning. A piston 15 is arranged in the pressure chamber 13 and projects through a central opening 17 with its tappet 16. The central opening 17 connects the pressure chamber 13 with a recess 19 arranged in the main part.

An expanding lever gearing 20 including four spring joints 21, 22, 23 and 24 is arranged in the recess 19. The spring joints 21, 22, 23 and 24 connect a central member 25 and two leg members 26 and 27 with one another and with the wall 28 and 29, respectively, of the recess 19. The expanding lever gearing 20 differs from a toggle lever gearing in that it includes an additional articulation point.

The wall 28 of the recess 19 together with the part of the boring bar 12 serving as tool carrier 30 forms an integral functional area of the main part 11 and the wall 29 of the recess 19 together with the compensating member 31 of the boring bar 12 acting as compensating mass forms an integral functional area of the main part 11. The tool carrier and compensating member have a similar geometrical construction.

The main part 11 further has a cover 33 with a clamping part 35 having a through-bore 34 for a tool changing system, not shown in the drawing. The clamping part 35 closes the pressure chamber 13 relative to the atmosphere. When a pressure medium is fed to the pressure chamber 13 via the through-bore 34, the suitably sealed piston moves up, from the perspective of the drawing, and in doing so acts on the central member 25 of the expanding lever gearing 20. The two leg members 26 and 27 are accordingly moved in the clockwise or counterclockwise direction, respectively, relative to the central member 25 so that the distance between the two outer, spring-jointed points 23 and 24 of the expanding lever gearing is increased. In this way, the tool carrier 30 and the compensating member (compensating mass) 31 are compelled to swivel in the clockwise and counterclockwise direction around the walls of the recess 19 of the main part 11 which act as bending zones 42 and 43. Since these movements are effected symmetrically relative to the rotational axis 44 of the described drill head, troublesome unbalance with respect to the rotational axis is compensated for.

The main part 11 thus has a first functional area represented by the expanding lever gearing and a second functional area represented by the bending zones 42 and 43, whose geometric forms are produced by means of electroerosion.

The swivel angle of the tool carrier relative to the compensating member can be changed by the thickness of the bending zones 42 and 43. For example, if the bending zone 43 associated with the compensating member is thicker than the bending zone 42 associated with the tool carrier 30, the left hand portion of the boring bar, i.e. the compensating members bends under the action of the supplied pressure medium by a smaller angle than the right-hand portion of the boring bar, i.e. the tool carrier. This can be important if the effective deflection of the boring bar, i.e. of the cutting chisel 36, is to be increased while taking into account a determined unbalance.

On the other hand, if the bending zone 43 is made so stiff that the deflection of the compensating member relative to the deflection of the tool carrier is negligible, the path of the tool carrier can be roughly doubled. However, in so doing, an unbalance occurs during the deflection as in previously known drill heads which are not balanced. This is important when two very similar types of drill head are to be produced in the manufacture of cutting chisel holders of this type for different which drill heads differ from one another only in the design of one zone, so that drill heads with or without unbalance compensation are realized.

While the foregoing description and drawings represent the preferred embodiments of the present invention, it will be obvious to those skilled in the art that various changes and modifications may be made therein without departing from the true spirit and scope of the present invention.

What is claimed is:

1. In a cutting chisel holder with a cutting chisel which can be clamped in, particularly a rotating drill head which can be precisely adjusted by hydraulic means, with a base, a driven member which is movable relative to the base, a fluid pressure medium chamber having a fluid inlet and arranged between the base and driven member, and with gearing members which are associated with the driven member and can be moved by the driven member in such a way that the cutting chisel is moved by small amounts around a curved path extending transversely to the rotational axis, and with a compensating member which compensates for the unbalance occurring during the deflection of the tool carrier by means of a symmetrical, but oppositely directed, movement, the improvement comprising that the tool carrier and said compensating member are connected via a spring-jointed expanding lever gearing, said gearing having a central member connecting the leg members which is acted upon by the driven member.

2. Cutting chisel holder according to claim wherein the driven member, the expanding gearing, the tool holder, and the compensating member form parts which are connected with one another without friction.

3. Cutting chisel holder according to claim 1, wherein the compensating member includes a bending zone having the same geometrical dimensions as a bending zone of the tool carrier.

4. Cutting chisel holder according to claim 1, wherein the compensating member includes a first bending zone having a first stiffness and wherein the tool carrier includes a second bending zone having a second stiffness.

5. Cutting chisel holder of claim 4, wherein said first stiffness is greater than said second stiffness.

6. Cutting chisel holder according to claim 1, wherein a cutting chisel is associated with the tool carrier as well as with the compensating member.

7. Cutting chisel holder according to claim 1, wherein the expanding lever gearing, the tool carrier, and the compensating member form a one-piece structural component part produced by electroerosion.

8. Cutting chisel holder of claim 4 wherein said first bending zone has different geometrical dimensions than said second bending zone.

9. Cutting chisel of claim 4 wherein said first stiffness is approximately equal to said second stiffness.

* * * * *